US010184043B2

(12) United States Patent
Niedersuess et al.

(10) Patent No.: US 10,184,043 B2
(45) Date of Patent: Jan. 22, 2019

(54) POLYPROPYLENE FILM WITH IMPROVED BALANCE OF MECHANICAL PROPERTIES

(75) Inventors: Peter Niedersuess, Ried/Riedmark (AT); Manfred Kirchberger, Prambachkirchen (AT); Ole Jan Myhre, Porsgrunn (NO)

(73) Assignee: BOREALIS TECHNOLOGY OY, Porvoo (FI)

( * ) Notice: Subject to any disclaimer, the term of this patent is extended or adjusted under 35 U.S.C. 154(b) by 785 days.

(21) Appl. No.: 12/159,190

(22) PCT Filed: Dec. 11, 2006

(86) PCT No.: PCT/EP2006/011916
§ 371 (c)(1),
(2), (4) Date: Jun. 25, 2008

(87) PCT Pub. No.: WO2007/076918
PCT Pub. Date: Jul. 12, 2007

(65) Prior Publication Data
US 2009/0004415 A1 Jan. 1, 2009

(30) Foreign Application Priority Data

Dec. 30, 2005 (EP) .................................... 05028754

(51) Int. Cl.
C08L 23/00 (2006.01)
C08L 23/06 (2006.01)
C08J 5/18 (2006.01)
C08L 23/08 (2006.01)
C08L 23/10 (2006.01)
C08L 23/04 (2006.01)
C08L 23/16 (2006.01)

(52) U.S. Cl.
CPC ............... C08L 23/06 (2013.01); C08J 5/18 (2013.01); C08L 23/08 (2013.01); C08L 23/10 (2013.01); C08J 2323/02 (2013.01); C08L 23/04 (2013.01); C08L 23/16 (2013.01); Y10T 428/1376 (2015.01); Y10T 428/249953 (2015.04)

(58) Field of Classification Search
USPC ................................................ 428/36.9, 220
See application file for complete search history.

(56) References Cited

U.S. PATENT DOCUMENTS

| 3,300,459 A | 1/1967 | Natta et al. |
| 5,286,552 A * | 2/1994 | Lesca et al. ................... 428/220 |
| 5,451,283 A * | 9/1995 | Josephy ................ B29C 55/023 156/229 |
| 5,919,877 A | 7/1999 | Tanaglia |
| 6,072,005 A * | 6/2000 | Kobylivker et al. .......... 525/240 |
| 2004/0116607 A1* | 6/2004 | Malm et al. ................... 525/240 |
| 2005/0119380 A1 | 6/2005 | Iwashita |
| 2006/0024520 A1* | 2/2006 | Kong et al. .................... 428/517 |

FOREIGN PATENT DOCUMENTS

| EP | 0060090 | 9/1982 |
| EP | 0 634 454 A1 | 1/1995 |
| EP | 0847420 | 6/1998 |
| EP | 0 877 052 A2 | 11/1998 |
| EP | 1283424 A1 | 2/2003 |
| FR | 2 729 963 A1 | 8/1996 |
| JP | H01237118 A | 9/1989 |
| JP | H1077373 A | 3/1998 |
| JP | 10237189 A | 9/1998 |
| JP | 10298398 A | 11/1998 |
| JP | 2001508813 T | 7/2001 |
| JP | 2002187997 A | 7/2002 |
| WO | 9964510 | 12/1999 |
| WO | 00 30850 | 6/2000 |
| WO | 0153078 | 7/2001 |
| WO | 0153079 | 7/2001 |
| WO | 03033575 | 4/2003 |
| WO | 2005/037539 A1 | 4/2005 |

OTHER PUBLICATIONS

"Standard Test Method for Melt Flow Rates of Thermoplastics by Extrusion Plastometer", ASTM International, Designation: D 1238-04c (Dec. 2004).
International Search Report and Written Opinion of the International Searching Authority issued in International Application No. PCT/EP2006/011916 dated Feb. 27, 2007.

* cited by examiner

Primary Examiner — Ellen S Wood
(74) Attorney, Agent, or Firm — Roberts Mlotkowski Safran Cole & Calderon, P.C.

(57) ABSTRACT

The present invention relates to a blown film made of a composition comprising a) a propylene heterophasic copolymer (A) with a matrix propylene polymer and an ethylene-propylene-rubber characterized in that the film has been monoaxially oriented in the machine direction with a stretch ratio of 1:1.1 to 1:10, to a process for making such a film, to the use of said composition in making such a film, and to an article comprising such a film.

19 Claims, No Drawings

POLYPROPYLENE FILM WITH IMPROVED BALANCE OF MECHANICAL PROPERTIES

The present invention relates to an oriented blown polypropylene film comprising a polypropylene heterophasic copolymer with an improved balance of mechanical properties. Furthermore, the present invention relates to the production and use of said film.

Due to the chemical and thermal resistance as well as mechanical strength of polypropylene, cast and blown films of polypropylene are used in different applications, in particular in medical and food packaging applications like retortable stand-up pouches. However, due to the high temperatures used during the retorting of films the good mechanical properties of polypropylene may be negatively affected.

Production of polypropylene films is often carried out as a cast film process. In such a process, a cooling of the melt is achieved by the use of a chill roll, so that polypropylene films with good optical and mechanical properties are obtained. Also blown film processes are used for the production of polypropylene film in which air cooling is used to cool the melt.

Independent from the process technology, the orientation of the molecular polypropylene chains in the machine direction results in a lower mechanical strength of the films, in particular in the transverse direction of the produced film.

Furthermore, in medical or food applications, polypropylene films may be sterilised at high temperature by steam or high energy radiation, particularly beta and gamma radiation. However, typical polypropylene submitted to this kind of treatment tends to soften and deform or turn yellow and/or become brittle.

According to WO 01/53079, the toughness of a blown film can be improved by using a multilayer film structure comprising a blended polypropylene layer and a polyethylene sealant layer.

WO 01/53078 discloses a multilayer film with one layer which comprises a coupled propylene polymer, and a further layer which comprises an in-reactor blend of a substantially linear polyethylene (or a homogeneously branched linear polyethylene) and a linear low density polyethylene, to obtain a blown film having improved mechanical properties.

EP 0 847 420 discloses a blend of polypropylene and polyethylene, which has a certain degree of radiation tolerance and can be used in medical and food packaging.

However, although conventional non-oriented polypropylene-based resin films as described in the above documents, have excellent heat resistance, the films are poor in impact resistance at low temperature.

Furthermore, it is known that if polypropylene film is stretched in one direction, the tensile strength in that direction is normally increased while the resistance to tear propagation in the direction of stretching is reduced. In addition, the resistance to tear propagation at right angles to the direction of stretching is usually increased. Hence, the orientation of a film only in one direction usually leads to an imbalance of the mechanical properties in oriented and non-oriented direction.

It is also known in the art to biaxially orient polypropylene film which is known as BOPP (biaxial oriented polypropylene) film. For example, WO 03/033575 relates to such a BOPP film and aims at obtaining good mechanical properties. However, due to the preorientation of the polypropylene chains which occurs during the film production, also biaxial oriented polypropylene films show an imbalance between the mechanical properties of machine and transverse direction.

Considering the above-mentioned disadvantages, it is the main object of the present invention to provide a film having an optimal balance between the mechanical properties in machine and transverse direction.

It is a further object of the invention that the film should show a high level of mechanical strength and toughness in both directions.

It is a still further object of the invention that the high level of mechanical strength and toughness in both directions is maintained after sterilisation.

The present invention is based on the finding that the above object can be achieved if a produced polypropylene blown film is oriented in the machine direction only, i.e. monoaxially in the machine direction, applying a specific stretch ratio, usually from 1:1.1 to 1:10.

Therefore, the present invention provides a blown film made of a composition comprising
  a) a propylene heterophasic copolymer (A) with a matrix propylene polymer and an ethylene-propylene-rubber characterized in that the film has been monoaxially oriented in the machine direction with a stretch ratio of 1:1.1 to 1:10.

As demonstrated below, the obtained film shows improved mechanical properties in both machine and transverse direction, in particular compared to non-oriented films. Especially, and surprisingly, also perpendicular to the orientation direction, namely in transverse direction the film shows improved mechanical properties, thus yielding a film with more balanced mechanical properties in both directions.

Furthermore, the high level of mechanical strength and toughness in machine and transverse direction of the film is also retained after sterilisation process.

Still further, it has been surprisingly found that the film of the present invention although having enhanced mechanical strength and toughness can be manually discerped in transverse direction. Therefore, the film of the present invention can be utilised in adhesive tape applications.

In a preferred embodiment, the composition the film is made of further comprises
  b) an ethylene homo- or copolymer (B).

The blown film is produced preferably on a single screw extruder with a preferred blow up ratio (BUR) of 2.5:1.

The obtained blown film preferably has a thickness of 30 to 500 micrometer, more preferably from 70 to 150 micrometer, still more preferably from 100 to 180 micrometer. The thickness of the film can be adjusted through the ratio between extruder output, take off speed and blow-up ratio (BUR).

In general, the orientation of a film can be achieved by reheating the non-oriented polypropylene film to a temperature where the crystals are partially melted, usually 120° C. to 160° C., stretching into the desired shape, then cooling it while stretched, to reform the crystals which locks the orientation in place. The orientation in the machine direction of the film can be obtained off-line or in-line with extrusion.

The film stretch ratio of the present film is from 1:1.1 to 1:10, preferably from 1:1.2 to 1:4, and still more preferably from 1:1.4 to 1:3.5.

The film of the present invention preferably comprises 50 to 90 wt.-%, more preferably 60 to 80 wt.-%, of propylene heterophasic copolymer (A) based on the total composition.

Furthermore, the amount of ethylene homo- or copolymer (B) preferably is from 50 to 10 wt.-%, more preferably 40 to 20 wt.-% based on the total composition.

The propylene heterophasic copolymer (A) of the present invention comprises a polypropylene homo- or copolymer as matrix polymer and an incorporated ethylene-propylene-rubber.

The heterophasic propylene copolymer may be produced by multistage process polymerisation of propylene and ethylene and optionally alpha-olefin such as bulk polymerisation, gas phase polymerisation, slurry polymerisation, solution polymerisation or combinations thereof using conventional catalysts. The heterophasic copolymer can be made either in loop reactors or in a combination of loop and gas phase reactor. Those processes are well known to one skilled in the art.

A preferred process is a combination of a bulk slurry loop reactor(s) and gas phase reactor(s). First, the propylene homo- or copolymer matrix is made either in loop reactor(s) or in a combination of loop and gas phase reactor.

The polymer produced in this way is transferred into another reactor and the disperse phase, the ethylene-propylene-rubber, is produced by copolymerising a mixture of ethylene and propylene with the same catalyst system, so obtaining a heterophasic system consisting of a semicrystalline matrix with a nearly amorphous elastomeric component dispersed within it. Preferably this polymerisation step is done in a gas phase polymerisation.

A suitable catalyst for the polymerisation of the heterophasic copolymer is any stereospecific catalyst for propylene polymerisation which is capable of polymerising and copolymerising propylene and comonomers at a temperature of 40 to 110° C. and at a pressure from 10 to 100 bar. Ziegler-Natta catalysts as well as metallocene catalysts are suitable catalysts.

Alternatively to producing the heterophasic copolymer in a sequential multistage process as described above, it can be produced by polymerising the matrix polymer and the ethylene-propylene-rubber in separate steps and melt blending the two polymers.

"Rubber" and "elastomeric copolymer" are in this context used as synonyms.

An ethylene propylene elastomeric copolymer may be produced by known polymerisation processes such as solution, suspension and gas-phase polymerisation using conventional catalysts. Ziegler-Natta catalysts as well as metallocene catalysts are suitable catalysts.

A widely used process is the solution polymerisation. Ethylene, propylene and catalyst systems are polymerised in an excess of hydrocarbon solvent. Stabilisers and oils, if used, are added directly after polymerisation. The solvent and unreacted monomers are then flashed off with hot water or steam, or with mechanical devolatilisation. The polymer, which is in crumb form, is dried with dewatering in screens, mechanical presses or drying ovens. The crumb is formed into wrapped bales or extruded into pellets.

The suspension polymerisation process is a modification of bulk polymerisation. The monomers and catalyst system are injected into the reactor filled with propylene. The polymerisation takes place immediately, forming crumbs of polymer that are not soluble in the propylene. Flashing off the propylene and comonomer completes the polymerisation process.

The gas-phase polymerisation technology consists of one or more vertical fluidised beds. Monomers and nitrogen in gas form along with catalyst are fed to the reactor and solid product is removed periodically. Heat of reaction is removed through the use of the circulating gas that also serves to fluidise the polymer bed. Solvents are not used, thereby eliminating the need for solvent stripping, washing and drying.

The production of ethylene propylene elastomeric copolymers is also described in detail in e.g. U.S. Pat. No. 3,300,459, U.S. Pat. No. 5,919,877, EP 0 060 090 A1 and in a company publication by EniChem "DUTRAL, Ethylene-Propylene Elastomers", pages 1-4 (1991).

Alternatively, elastomeric ethylene-propylene copolymers, which are commercially available and which fulfill the indicated requirements, can be used.

The heterophasic copolymer is then produced by combining the matrix polymer in the form of powder or granules and the elastomeric copolymer in a melt mixing device.

In case a polypropylene random copolymer is used as matrix polymer for the heterophasic copolymer, the comonomers preferably are linear alpha-olefins or branched alpha-olefins like ethylene, butene, hexene etc. In the present invention ethylene is most preferred.

The comonomer content is preferably equal to or below 10 wt.-%, more preferably between 4 and 8 wt %, based on the total polypropylene random copolymer.

However, preferably the matrix polymer is a polypropylene homopolymer.

Furthermore, the heterophasic copolymer contains an ethylene-propylene-rubber preferably in a content of equal to or below 35 wt %, more preferably from 10 to 20 wt %, based on the total weight of polymer (A).

The ethylene-propylene-rubber preferably has a propylene content of 40 to 80 wt. %, more preferably of from 45 to 60 wt. %, based on the total amount of the ethylene-propylene-rubber.

The ethylene-propylene rubber apart from ethylene and propylene monomer units may contain further alpha-olefin monomer units. However, it is preferred that the ethylene-propylene rubber consists of ethylene and propylene monomer units.

Propylene heterophasic copolymer (A) preferably has a melt flow rate (230° C./2.16 kg) (MFR$_2$) of from 0.1 to 15 g/10 min, more preferably from 0.5 to 10 g/10 min.

The ethylene homo- or copolymer (B) of the composition of the present invention preferably is a linear polyethylene copolymer or a low density polyethylene homo- or copolymer.

A linear polyethylene copolymer may be produced in a catalyst supported polymerisation process in a known manner. The polymerisation catalyst include coordination catalysts of a transition metal, such as Ziegler-Natta (ZN), metallocenes, non-metallocenes, Cr-catalyst etc. The catalyst may be supported, e.g. with conventional supports including silica, Al-containing supports and magnesium dichloride based supports.

The comonomers of the linear polyethylene copolymer preferably are $C_2$ to $C_{20}$ alpha-olefins, more preferably $C_4$ to $C_8$ alpha-olefins. As alpha-olefins may be used 1-butene, 1-pentene, 1-hexene, 1-octene, 4-methyl-1-pentene, 3-methyl-1-pentene and the like.

The linear polyethylene copolymer preferably has a density from 0.900 and 0.950 g/cm$^3$, preferably from 0.910 to 0.930 g/cm$^3$.

In the case a low density copolymer is used as ethylene copolymer (B), n-butyl acrylate, methyl acrylate or vinyl acetate may be used as comonomer. The comonomer content preferably is between 0.1 wt % and 40 wt %, more preferably between 3 wt % and 10 wt %.

The low density polyethylene is produced in conventional high-pressure polymerisation process. The low density polyethylene is characterised by its highly branched chain structure.

The low density polyethylene preferably has a density from 0.900 to 0.950 g/cm$^3$, more preferably from 0.910 to 0.930 g/cm$^3$.

The MFR (190° C., 2.16 kg) of the ethylene homo- or copolymer (B) is preferably between 0.1 and 10 g/110 min, more preferably between 0.5 and 8 g/10 min.

Optionally, additives conventionally used in polyolefin-based film materials, for example antioxidants, neutralizer, inorganic fillers, antiblocking agents, nucleation agents, lubricants or antistatic agents, may be added to the composition before, during or after the blending step in a manner known in the art.

Usually, the amount of such conventional additives is 10 wt. % or less of the total polymer composition used for film production.

The film of the invention preferably has an impact strength in machine direction of at least 1300 kJ/m$^2$, more preferably of at least 1350 kJ/m$^2$.

Usually, the film has an impact strength in machine direction of at most 3500 kJ/m$^2$.

Furthermore, the film preferably has an impact strength in transverse direction of at least 250 kJ/m$^2$, preferably of at least 500 kJ/m$^2$ and more preferred of at least 2000 kJ/m$^2$.

Usually, the film has an impact strength in transverse direction of at most 4000 kJ/m$^2$.

In case a polypropylene film is used in a medical application, the film or article may be sterilized by one of the three generally techniques: autoclave, ethylene dioxide, or radiation treatment. Often, the preferred technique is radiation sterilization, wherein the film is bombarded with, for example, high energy radiation, such as gamma-ray or electron beam radiation, or peroxide radicals generated by lower energy radiation, such as UV light. The sterilisation process leads to degradation of the mechanical properties of the film.

If the film of the invention is subjected to a sterilization treatment it is preferred that the film is sterilized by heated air or hot steam.

The non-sterilised film of the present invention preferably has elongation at break in machine direction of at least 10%, more preferably of at least 15%.

Furthermore, the non-sterilised film preferably has an elongation at break in transverse direction of at least 100%, more preferably of at least 140%.

The high level of mechanical strength and toughness in machine and transverse direction, especially the good balance between these properties in both machine and transverse direction can be also retained to a high degree after a sterilisation process while in a non-oriented cast or blown film the anisotropic behaviour after sterilisation even worsens.

Accordingly, after sterilisation, the film of the present invention preferably has an elongation at break in machine direction of at least 10%, preferably of at least 40%.

Furthermore, after sterilisation, the film of the present invention preferably has an elongation at break in transverse direction of at least 20%, preferably at least 50%.

The present invention also relates to a process for the production of monoaxially oriented polypropylene blown film characterized in that a composition comprising
a) a propylene heterophasic copolymer (A) with a matrix propylene polymer and an ethylene propylene rubber is formed into a film in a blowing process which film then is monoaxially oriented in the machine direction in a stretch ratio of 1:1.1 to 1:10.

In case the film of the present invention is used in a medical application, the film after the orientation may be sterilized, preferably by a hot steam sterilization process. In the following examples, the films of the present invention were sterilized with hot air.

Furthermore, the film of the present invention is applicable for different articles. The articles, which are produced of said film, may be a stand-up pouch or an adhesive tape and the like.

EXAMPLES

1. Measurement Methods a) Tensile Impact Strength/Elongation

The tensile impact strength is measured by the tensile impact test according to the standard EN ISO 8256:1996 on blown films with 50 μm. Measurements of the test specimens were: 80 mm×10 mm. For each tensile impact strength value in tables 1 and 2 an average from 10 determinations was calculated.

Elongation at break was measured manually on destroyed specimens from tensile-impact strength testing by dividing the total length of the specimen parts after tensile-impact strength testing by the length of the specimen from before tensile-impact strength testing.

b) Melt Flow Rate

The melt flow rate is determined according to ISO 1133 and is indicated in g/10 min. The MFR is an indication of the flowability, and thus the processability, of the polymer. The higher the melt flow rate, the lower the viscosity of the polymer. The MFR is measured with a load of 2.16 kg at 230° C. for polypropylene or 190° C. for polyethylene.

c) Density

The density is determined according to ISO 1183 and is indicated in g/cm3 or kg/m3. The density is an indication of the crystallinity of the polymer 2. Experiments a) Materials The starting materials for the films produced in the present examples are commercially available and had the following properties:

Polymer (A) was used in an amount of 70 wt % based on the total polypropylene composition. It was a heterophasic propylene copolymer having a MFR (230° C., 2.16 kg) of 0.85 g/10 min, with 85 wt % of polypropylene homopolymer as matrix polymer and 15 wt % ethylene-propylene rubber which contained 50 wt % ethylene.

Polymer (B) was used in an amount of 30 wt % based on the total polypropylene composition. It was a linear low density polyethylene with a density of 0.923 g/cm3, a MFR (190° C., 2.16 kg) of 0.2 g/10 min and 7 wt % butene comonomer.

b) Blown Film

Blown films were produced on a single screw extruder with barrel diameter of 70 mm and a round-section die of 200 mm with 1.2 mm die gap in combination with a monolip cooling ring and internal bubble cooling (IBC). Melt temperature was 220° C. in the die; the temperature of the cooling air was kept at 15° C. and the blow up ratio (BUR) 2.5:1. A film thickness of 100 μm was adjusted through the ratio between extruder output, take off speed and BUR.

c) Orientation Process

Orientation is achieved by reheating the non-oriented polypropylene film at a temperature of 135° C., stretching into the machine direction and then after an annealing step the film is cooled. The films are stretched in a ratio of 1:2.

d) Sterilisation Process

The films are stored for 2 hours in a heated oven at 121° C. In between the film layers a paper is given in order to prevent sticking together of the film layers.

TABLE 1

| Film thickness | Material | Tensile-impact strength [kJ/m²] | | Elongation at break [%] | |
|---|---|---|---|---|---|
| 50 μm | | MD | TD | MD | TD |
| Example 1 (not sterilised) | Blown Film ori. 1:2 | 1364.6 | 2156 | 16.7 | 146.1 |
| Comparative Example 1 (not sterilised) | Blown Film non-ori. | 886.9 | 261.9 | 30 | 0 |

TABLE 2

| Film thickness | Material | Tensile-impact strength [kJ/m²] | | Elongation at break [%] | |
|---|---|---|---|---|---|
| 50 μm | | MD | TD | MD | TD |
| Example 1a (after sterilisation) | Blown Film ori. 1:2 | 2283.9 | 2122.4 | 45.4 | 58.7 |
| Comparative Example 1a (after sterilisation) | Blown Film non-ori. | 1975.4 | 403.1 | 84.9 | 0 |

As can be seen from the results of Tables 1 and 2 the mechanical properties of the present films in both machine and in transverse direction are balanced before and after sterilisation.

The invention claimed is:

1. A blown film made of a composition comprising
50 to 90 wt. % of a propylene heterophasic copolymer (A) having a MFR(230° C./2.16 kg) from 0.5 to 15 g/10 min, with a matrix propylene polymer and 10 to 20 wt. % of an ethylene-propylene-rubber, wherein the matrix propylene polymer of propylene heterophasic copolymer (A) is a propylene copolymer comprising ethylene as comonomer in an amount of from 0.1 to 10 wt. % and wherein the ethylene-propylene-rubber has a propylene content from 40 to 80 wt. % of the total weight of the ethylene-propylene-rubber,
an ethylene homo- or copolymer (B), having a density greater than 0.923 and up to 0.950 g/cm³, and
optionally less than 10 wt. % or less of additives including antioxidants, neutralizers, inorganic fillers, antiblocking agents, nucleation agents, lubricants or antistatic agents,
wherein the film is monoaxially oriented only in the machine direction with a stretch ratio of 1:1.1 to 1:10, and has a thickness of more than 70 μm to about 150 μm, said film having a tensile impact strength in the machine direction of at least 1300 kJ/m² to about 3500 kJ/m², and a tensile impact strength in the transverse direction of at least 250 kJ/m² to about 4000 kJ/m².

2. A film according to claim 1, wherein the film is monoaxially oriented in the machine direction with a stretch ratio of 1:1.2 to 1:4.

3. A film according to claim 1 wherein the composition comprises 60 to 80 wt. % of propylene heterophasic copolymer (A).

4. A film according to claim 1 wherein the ethylene homo-or copolymer (B) is present in an amount of 50 wt. % to 10 wt. %.

5. A film according to claim 1 wherein the matrix propylene polymer of the propylene heterophasic copolymer (A) is a homopolymer.

6. A film according to claim 1 wherein the matrix propylene polymer of propylene heterophasic copolymer (A) is a propylene copolymer comprising ethylene as a comonomer.

7. A film according to claim 1 wherein the content of the ethylene-propylene-rubber in the propylene heterophasic copolymer (A) is about 15 wt. % based on the total weight of polymer (A).

8. A film according to claim 1 wherein base propylene heterophasic copolymer (A) has a MFR (230° C./2.16 kg) from 0.1 to 15 g/10 min.

9. A film according to claim 1 wherein the ethylene homo- or copolymer (B) is a linear ethylene copolymer or a low density ethylene homo- or copolymer.

10. A film according to claim 1 wherein the ethylene homo- or copolymer (B) is a linear ethylene copolymer or a low density ethylene homo- or copolymer and wherein the linear ethylene copolymer is a $C_4$ to $C_8$ alpha-olefin.

11. A film according to claim 1 wherein the ethylene homo- or copolymer (B) has a density greater than 0.910 to 0.930 g/cm³.

12. A film according to claim 1 wherein the ethylene homo- or copolymer (B) has an MFR (190° C./2.16 kg) of 0.1 to 10 g/10 min.

13. A film according to claim 1 wherein the film has an elongation at break in transverse direction of at least 100% before sterilization.

14. A film according to claim 1 that is oriented and sterilized.

15. A sterile film according to claim 1 that has an elongation at break in transverse direction of at least 20%.

16. A process for the production of monoaxially oriented polypropylene blown film wherein a composition comprising
(A) 50 to 90 wt. % of a propylene heterophasic copolymer (A) having a MFR(230° C./2.16 kg) from 0.5 to 15 g/10 min, with a matrix propylene polymer and 10 to 20 wt. % of an ethylene propylene rubber, wherein the matrix propylene polymer of propylene heterophasic copolymer (A) is a propylene copolymer comprising ethylene as comonomer in an amount of from 0.1 to 10 wt. % and wherein the ethylene-propylene-rubber has a propylene content from 40 to 80 wt. % of the total weight of the ethylene-propylene-rubber,
(B) an ethylene homo- or copolymer (B), having a density greater than 0.923 up to 0.950 g/cm³, and
(C) optionally less than 10 wt. % of additives including antioxidants, neutralizers, inorganic fillers, antiblocking agents, nucleation agents, lubricants or antistatic agents,
wherein said composition is formed into a film having a thickness of more than 70 μm to about 150 μm in a blowing process which film then is monoaxially oriented in the machine direction in a stretch ratio of 1:1.1 to 1:10, said film having a tensile impact strength in the machine direction of at least 1300 kJ/m² to about 3500 kJ/m², and a tensile impact strength in the transverse direction of at least 250 kJ/m² to about 4000 kJ/m².

17. A process according to claim 16 wherein the film after orientation is sterilized.

18. An article comprising a film according to claim 1.

19. An article comprising a film according to claim 1 which is a stand-up pouch or an adhesive tape.

\* \* \* \* \*